United States Patent [19]
Castleman et al.

[11] Patent Number: 5,623,098
[45] Date of Patent: Apr. 22, 1997

[54] DUAL MODE SINGLE CAVITY COMPENSATION FOR MICROWAVE RESONATORS

[75] Inventors: Bruce W. Castleman, St. Petersburg; David S. Donnelly, Palm Harbor; Paul O. Rock, St. Petersburg, all of Fla.

[73] Assignee: Honeywell Inc., Minneapolis, Minn.

[21] Appl. No.: 218,094

[22] Filed: Mar. 25, 1994

[51] Int. Cl.$^6$ ............................................. G01P 15/08
[52] U.S. Cl. .............................. 73/497; 73/514.16
[58] Field of Search ............................ 73/497, 517 R, 73/517 AV, 514.16; 333/229, 232, 234

[56] References Cited

U.S. PATENT DOCUMENTS

| | | | |
|---|---|---|---|
| 3,636,752 | 1/1972 | Ishii | 73/517 R |
| 3,909,713 | 9/1975 | Billeter | 324/58.5 |
| 4,258,572 | 3/1981 | Loper, Jr. | 73/497 |
| 4,904,928 | 2/1990 | Lewis | 324/636 |
| 5,261,278 | 11/1993 | Kain | 73/517 R |
| 5,351,541 | 10/1994 | Petrovich | 73/517 R |

OTHER PUBLICATIONS

NTIS Tech Notes, No. 10, Oct. 1985 Springfield, VA p. 1207 V. S. Reinhardt et al "Superconducting–Cavity Accelerometer".

1651088, May 1991, Derwent Publications.
"Space Applications of Superconductivity: Instrumentation for Gravitational and Related Studies" Author–R.L. Peterson Issued: 1980.
"Operation of an Ultrasensitive Superconducting Accelerometer" Author: Oelfke, Hamilton and Darling Issued: Jan. 1, 1981.
"Joint Services Data Exchange for Guidance, Navigation and Control" Author: B. W. Castleman Issued: Oct. 26–29, 1992.
"Temperature Compensation of $TE_{011}$—Mode Circular Cavities" Author: A. Atia and A. Williams Issued: Oct. 1976.
"A Supersensitive Accelerometer For Spacecraft Gradiometry" Author: V. Reinhardt, F. von Bun, J. Turneaure Issued: 1982 IEEE.

*Primary Examiner*—Christine K. Oda
*Attorney, Agent, or Firm*—Charles J. Ungemach

[57] ABSTRACT

A microwave resonator, useable for acceleration detection, having a cavity in which a resonant frequency $F_1$ which changes with changes in length of the cavity and with change in crossectional dimensions of the cavity is compensated for changes in crossectional dimensions by forming a second resonant frequency $F_2$ in the cavity which changes with changes in crossectional dimensions and modifying $F_1$ by $F_2$ so as to eliminate the change in $F_1$ due to changes in crossectional dimensions.

6 Claims, 2 Drawing Sheets

DUAL MODE SINGLE CAVITY COMPENSATION FOR MICROWAVE RESONATORS

BACKGROUND OF THE INVENTION

1. Field of the Invention

The present invention relates to microwave resonators and more particularly to microwave resonators that may be used for acceleration detection, and to a method for compensating such resonators for cavity dimension changes that can be caused by factors such as temperature variation.

2. Description of the Prior Art

Microwave resonators have long been known in the art. Typically they comprise a cavity formed, for example by a hollow cylindrical member, usually circular in cross-section although other cross-sectional shapes have been used, closed at both ends and with a high frequency oscillator connected through a suitable connector at one end of the cavity to radiate radio frequency energy therein. A second connector in the cavity receives a portion of the energy Which is conducted to a peak detector. At certain frequencies, a standing wave known as a "transverse electric resonant peak" is established and the peak detector shows a maximum value. The frequency at which such standing waves are formed depends on the length and the cross-sectional area of the cavity. Such a cavity may be used to sense acceleration by making one end movable under the force of acceleration so as to change the cavity length and thus the standing wave. Such a prior art accelerometer can be as seen in FIG. 1. In FIG. 1, a container 10 is formed from a hollow cylinder 12 having a bottom end 14 and a top lend 16. Container 12 produces a cavity 18 with a length Z and a cross-sectional area represented by diameter A (for a circular cross-section). An RF oscillator 20 produces a signal on a conductor 22 connected to a connector 24 extending through the bottom end 14 so as to radiate energy into cavity 18. The radiated energy is received through a connector 26 and, by a conductor 28, is presented to a suitable peak detector 30. The output of the peak detector is connected back to oscillator 20 by a conductor 32. The frequency produced by the oscillator 20 is changed until the peak detector detects a peak indicating that a standing wave has been established in the cavity 18. The signal from the peak detector on conductor 32 stops the frequency change of the oscillator 20 and the frequency causing the standing wave is presented from oscillator 20 to output circuitry 36, such as a microprocessor, via a conductor 38.

The second end 16 of container 10 is arranged to be movable, up and down, as shown by double headed arrow 40 along the inner surface of cylinder 12, and is fastened by a spring 44 to a base member 42 which is rigidly connected to cylinder 12. If the container 10 is subjected to acceleration up or down in either direction of arrow 40, upper end 16 will move soi as to increase or decrease the length Z of cavity 18. The change in length Z causes a change in the frequency at which the standing wave is established and the peak detector 30 will again operate to cause oscillator 20 to change frequency until the standing wave is reestablished. The frequency of the new peak compared to the frequency of the old peak is related to the change in Z and thus to the acceleration experienced by the container 10. The output circuitry operates on the two frequencies received on conductor 38 to produce an output shown by arrow 46 indicative of acceleration.

The apparatus described in connection with FIG. 1 will operate satisfactorily so long as the only cavity dimension change is that due to acceleration. Unfortunately, however, other factors such as temperature changes can also affect the cavity dimensions and would cause false acceleration indications if left uncompensated.

There have been several suggestions for compensating for temperature proposed in the prior art. For example, as shown in FIG. 1, a temperature sensor 47 can be mounted on cylinder 12 and used to measure any temperature changes and to provide an input indicative thereof on a line 48 to the output circuitry 36 which would then correct the output on line 46 in accordance therewith. This is not practical for very accurate systems since temperature measurements to $\frac{1}{100}$ of a degree centigrade are necessary and variations of temperature greater than this may be found in different parts of the cavity. Thus detecting the temperature variation at any location in the cavity may not provide information necessary to determine the change in cavity dimension since other parts of the cavity may be subjected to different temperature variations. Another temperature compensation technique has been suggested in the prior art. A second container having a second cavity therein and with second oscillators, peak detectors etc. is mounted on top of the first container so that as the upper end 16 of FIG. 1 forms the lower end of the second cavity. Thus as upper end wall 16 moves to increase or decrease the length Z in FIG. 1, it will act oppositely to decrease or increase the length of the second cavity in the second container. The outputs of the two cavities are combined to produce the indication of acceleration (the effect of acceleration on the two cavities is opposite, i.e. one standing wave frequency will increase while the other decreases) but both are indicative of the acceleration. However, if temperature changes effect both cavities in the same way, the effect of temperature on cavity dimension is nullified. While this system should operate satisfactorily in low to medium accuracy acceleration measurement systems, the need for precise temperature uniformity between the two cavities or the precise measurement of each cavity make this impractical for high precision application. Furthermore, the requirement for two cavities and all the associated apparatus and electronics is burdensome from a space and cost standpoint.

BRIEF DESCRIPTION OF THE PRESENT INVENTION

The present invention overcomes the problems of the prior art by use of the family of standing waves known as "transverse magnetic resonancies." The frequency at which a transverse magnetic resonant peak is produced is known to change with the cross-sectional area changes of the cavity but for a certain subset of these resonancies, not with changes in cavity length. Thus, the frequency of certain specific transverse magnetic peaks is not responsive to acceleration but only to changes in cavity cross-sectional dimensions. The cross-sectional dimensions, which change with factors such as temperature, will affect the acceleration responsive output and, accordingly, the output change due to cross-sectional dimension change may be used to compensate for the acceleration responsive output.

DETAILED DESCRIPTION OF THE PRESENT INVENTION

Figure 1:
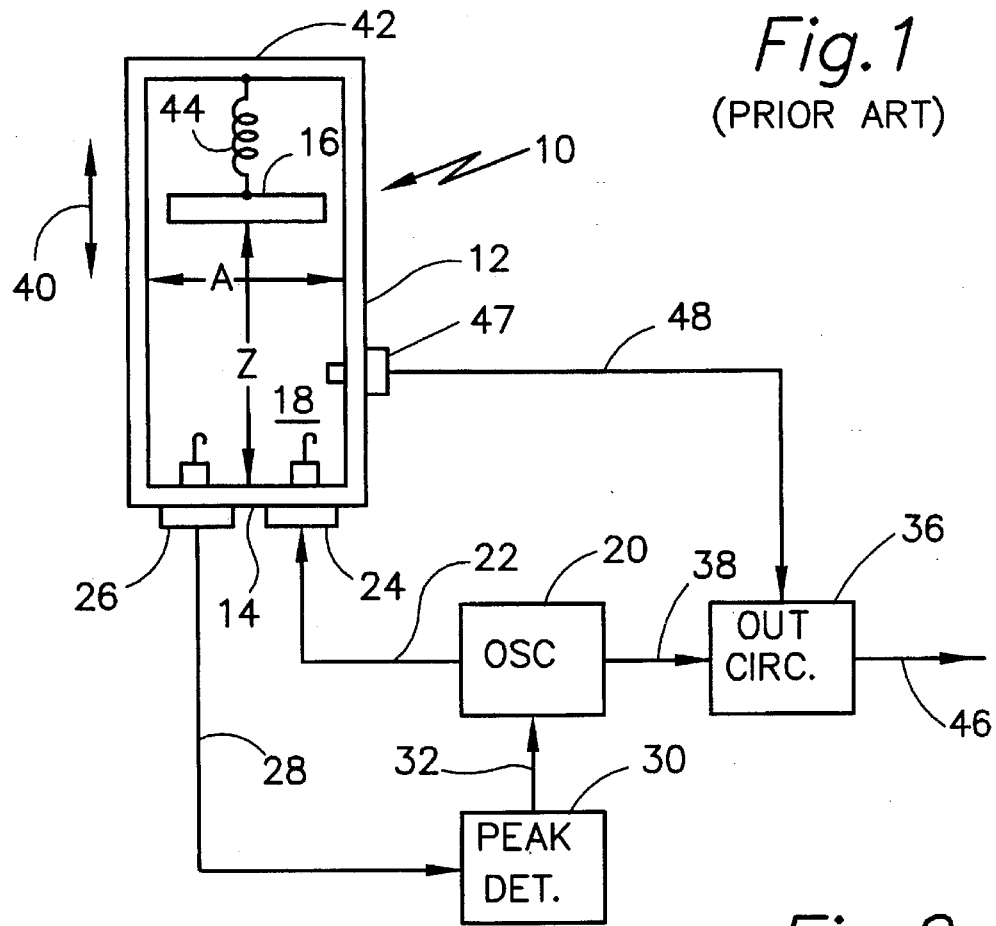
FIG. 1 is a schematic showing of a prior art acceleration responsive system.
Figure 2A:
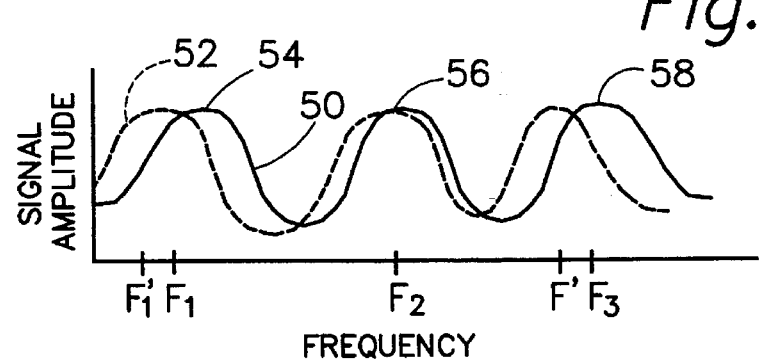
FIGS. 2a and 2b are graphs showing the resonate peaks and their variation with acceleration and cavity dimension change; and, FIG. 3 is a schematic showing of a preferred embodiment of the present invention.

FIG. 2a shows a graph in solid lines 50 of the output received by peak detector 30 of FIG. 1 with changes of frequency produced by oscillator 20 of FIG. 1 and shows in dashed lines 52 the shifted output due to acceleration experienced by the container 12 of FIG. 1. It is seen that a plurality of peaks 54, 56 and 58 representing resonant standing waves in cavity 18 of FIG. 1 are formed at frequencies $F_1$, $F_2$ and $F_3$ respectively. There are other peaks but only three have been shown for simplicity. It is also seen that when subjected to acceleration, peaks 54 and 58 are shifted to the left to frequencies $F_1'$ and $F_3'$ but that peak 56 does not change position from frequency $F_2$ with acceleration. Peaks 54 and 58 are "Transverse Electric Resonant Peaks" while peak 56 is a particular "Transverse Magnetic Resonant Peak" (as above described). By measuring the change from $F_1$ to $F_1'$ or $F_3$ to $F_3'$ an indication of acceleration can be obtained as in FIG. 1.

Figure 2B:
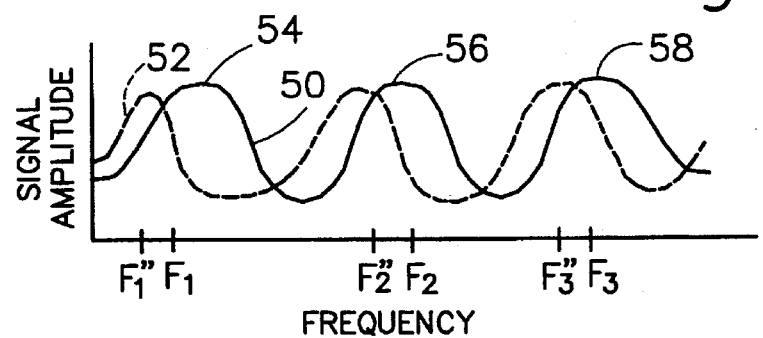

FIG. 2b shows the graph of FIG. 2a with solid line 50 forming peaks 54, 56 and 58 at $F_1$, $F_2$ and $F_3$ respectively. Dashed line 52 shows the peaks 54, 56 and 58 when subjected to dimension changes, as for example, due to temperature variations. It is now seen that all three peaks have been shifted to the left to frequencies $F_1''$, $F_2''$ and $F_3''$ respectively. The apparatus of FIG. 1 would also respond to these dimensional changes to produce false indications of acceleration. However, peak 56 which only responds to dimensional changes can be used, as will be shown in FIG. 3, to compensate for such changes.

Figure 3:
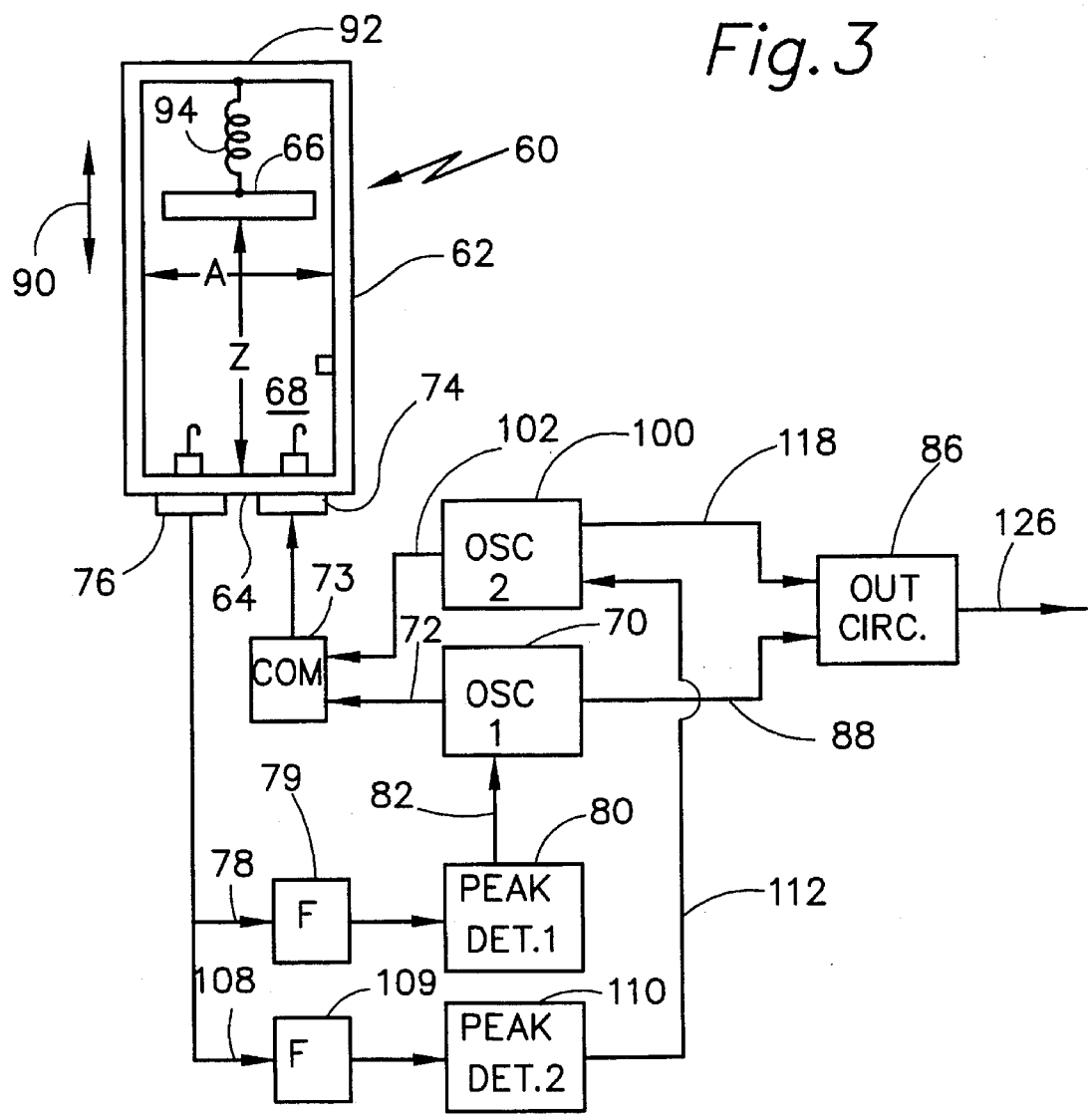

In FIG. 3, a container 60 is formed from a hollow cylinder 62 having a bottom end 64 and a top end 66. Container 62 produces a cavity 68. An RF oscillator 70 produces a signal on a conductor 72 connected through a combiner 73 to a connector 74 extending through the bottom end 64 so as to radiate energy into cavity 68. The radiated energy is received through a connector 76 and by a conductor 78 through a filter 79 to first suitable peak detector 80. The output of the peak detector 80 is connected back to oscillator 70 by a conductor 82. The frequency produced by the oscillator 70 is changed until the peak detector 80 detects a peak, such as peak 54 of FIG. 2a, indicating that a standing wave suitable for acceleration detection has been established in the cavity 68. The signal from the peak detector 80 on conductor 82 stops the frequency change of the oscillator 70 and the frequency, such as $F_1$, causing the standing wave 54 is presented from oscillator 70 to an output circuit 86, such as a microprocessor, via a conductor 88.

The second end 66 of container 60 is arranged to be movable, up and down, as shown by double headed arrow 90 along the inner surface of cylinder 62, and is fastened by a spring 94 to a base member 92, which is rigidly connected to cylinder 62. If the container 60 is subjected to acceleration up or down in either direction of arrow 90, upper end 66 will move so as to increase or decrease the length Z of cavity 68. The change in length Z causes a change in the frequency to say $F_1^{11}$ at which the standing wave is established and the peak detector 80 will again operate to cause oscillator 80 to change frequency until the standing wave is reestablished. The frequency $F_1^{11}$ of the new peak compared to the frequency $F_1$ of the old peak is related to the change in Z and thus to the acceleration experienced by the container 10.

The apparatus thus far described in FIG. 3 is quite similar to that of FIG. 1. FIG. 3 also shows a second oscillator 100 which produces a second frequency on a conductor 102 and through the combiner 73 to the connector 74 so that RF energy of the second frequency on conductor 102 is radiated into cavity 68. Actually, combiner 73 operates to combine the frequencies on both conductors 72 and 102 so as to radiate both frequencies into cavity 68, although a separate connector could be used if necessary. The radiated energy is received through the connector 76 and by a conductor 108 through a filter 109 to second suitable peak detector 110. The output of the peak detector 110 is connected back to oscillator 100 by a conductor 112. The frequency produced by the oscillator 100 is changed until the peak detector 110 detects a peak, such as peak 56 of FIGS. 2a and 2b, indicating that a standing wave suitable for dimension change detection has been established in the cavity 68. The signal from the peak detector 110 on conductor 112 stops the frequency change of the oscillator 100 and the frequency, such as $F_2$, causing the standing wave 56 is presented from oscillator 100 to the output circuit 86 via a conductor 118. Output circuit 86 operates on the input frequencies to produce a resulting output on a line 126 indicative of acceleration and corrected for changes in dimension due to factors such as temperature.

As mentioned above, the output circuitry 86 may be a microprocessor programmed to solve the equations relating to the resonant frequencies of cavities. For example, for a cylindrical resonator with circular correction, the frequency of resonance for the cavity sensitive to acceleration is derived from equation 13-33 on page 219 of a book entitled "Microwave Transmission Design Data" by Theodore Moron and Published by Dover Publications Inc. New York, N.Y. on 219:

$$F_0 = C/2 \sqrt{(L_1/Z_0)^2 + (2\mu_{mn}/\pi a_0)^2} \tag{1}$$

where $F_0$ is any resonant frequency such as $F_1$ in FIG. 2a

C is the velocity of light, $L_1$ is an integer equal to the number of half wavelengths along the cavity axis, $Z_0$ is the length of the cavity such as Z in FIG. 3, $\mu_{mn}$ is the nth root of the equation $Jm(\mu)=0$ where J is a bessel function, and $a_0$ is the diameter of the cavity such as A in FIG. 3.

Thus, for the resonant frequencies $F_1$, $F_2$, and $F_3$ of FIG. 3:

$$F_1 = C/2 \sqrt{(L_a/Z)^2 + (2\mu_{mn}/\pi A)^2} \tag{1}$$

$$F_2 = C/2 \sqrt{(L_b/Z)^2 + (2\mu_{pq}/\pi A)^2} \tag{2}$$

and $$F_3 = C/2 \sqrt{(L_c/Z)^2 + (2\mu_{rs}/\pi A)^2} \tag{3}$$

where $L_a$, $L_b$, and $L_c$ are the number of half wavelengths along the cavity axis for the three frequencies $F_1$, $F_2$ and $F_3$ respectively. Since the only unknowns in these equations are the cavity length Z and the diameter A, (having designed the cavity and electronics to predetermine the integers $L_a$, $L_b$ and $L_c$ and subscripts mn, pq, and rs) any two of the equations can be solved for Z and A. Successive measurements establish the changes in diameter that (by design) can be attributed to changes in temperature.

A special case can be made of equation 2 since $F_2$ can be designed to be a "transverse magnetic resonant peak" with $L_b$=zero. Since it does not respond to changes in length, equation (2) reduces to:

$$F_2=(\mu_{pq}/\pi A)C \quad (4)$$

or $$A=(\mu_{pq}/\pi F)C \quad (5)$$

This considerably simplifies the dynamics of the computations performed by the microprocessor which will operate to correct $F_1$ or $F_3$ in accordance with $F_2$.

Thus it is seen that I have provided an improved accelerometer having high accuracy and without increasing the size of the cavity and without the expense of dual cavity electronics. Many changes will occur to those skilled in the art. For example, while I have shown two oscillators and two peak detectors in FIG. 3, a single oscillator and single peak detector could be used with their outputs alternately connected to the cavity rather than at the same time. Also, different connectors for the cavity may be used and alternate ways of mounting the movable end of the cavity to be responsive to acceleration may be used. The shape and size of the cavity may also be changed without departing from the spirit and scope of the invention. I, therefore, do not intend to be limited to the specific apparatus used in connection with the preferred embodiment but intend only to be limited by the following claims.

We claim:

1. Apparatus for compensating a microwave cavity for changes in crossectional area comprising:

oscillator means;

means connecting said oscillator means to said cavity for introducing RF energy thereto to produce a first standing wave at a first resonant frequency which changes with changes in cavity length and with the changes in cavity crossectional area, said oscillator means producing a first output indicative of the first resonant frequency;

means connecting said oscillator means to said cavity for introducing RF energy thereto to produce a second standing wave at a second resonant frequency which changes with the changes in cavity crossectional area, said oscillator means producing a second output indicative of the second resonant frequency;

computing means connected to receive the first and second outputs and to produce a resultant output indicative of the changes of cavity length which does not change with the changes in cavity crossectional area.

2. In a microwave resonator having a cavity therein and which includes a first oscillator for generating RF energy in the cavity to produce a first resonant peak at a first frequency which changes with changes in cavity length and in cavity cross sectional area, apparatus for compensating for changes in the cavity cross sectional area comprising:

a second oscillator for generating RF energy in the cavity to produce a transverse magnetic resonant peak at a second frequency which changes with the changes in cavity cross sectional area; and means to receive the first and second frequencies and to modify the changes in the first frequency with the changes in the second frequency so as to remove the effects of changes in the cavity cross sectional area from the first frequency.

3. A microwave resonator having a cylindrical cavity with circular crossectional area therein and which includes oscillator means for generating RF energy in the cavity to produce a first resonant peak at a first frequency, $F_1$, where $$F_1 = C/2 \sqrt{(L_1/Z)^2 + (2\mu_{mn}/\pi A)^2}$$

and a second resonant peak at a second frequency, $F_2$ where $$F_2 = C/2 \sqrt{(L_1/Z)^2 + (2\mu_{pq}/\pi A)^2}$$

means for generating first and second signals indicative of $F_1$ and $F_2$; and computing means connected to the means for generating the first and second signals to receive the first and second signals and to solve for Z and A.

4. An accelerometer comprising:

a cylindrical container having first and second ends to form a cavity with an axis, the cavity having dimensions including a diameter A and a length Z, the second end being movable along the axis in response to acceleration along the axis to change the length Z;

oscillator means for producing RF energy at various frequencies;

means connecting the oscillator means to the cavity to establish a first resonant frequency $F_1$ which varies with changes in the length Z due to the acceleration and with changes in the diameter A and connecting the oscillator means to the cavity to establish a second resonant frequency $F_2$ which varies with changes in the diameter A; and computer means connected to receive signals indicative of $F_1$ and $F_2$ and to modify $F_1$ in accordance with $F_2$ to produce a resultant output which varies with the changes in the length Z due to the acceleration but not to the changes in the diameter A.

5. Apparatus for measuring acceleration comprising a single cylindrical microwave resonator cavity of predetermined normal length (Z) and of normal diameter (A);

means supplying RF energy to the cavity so that two resonant modes exist at frequencies $F_1=C/2\sqrt{(L_a/Z)^2+(2\mu_{mn}/\pi A)^2}$ and $F_2=C/2\sqrt{(L_b/Z)^2+(2\mu_{pq}/\pi A)^2}$ respectively, which said frequencies vary with changes in length ($\Delta Z$) representative of changes of acceleration and with changes in diameter ($\Delta A$);

detection apparatus connected to said cavity to detect $F_1$ and $F_2$; and output circuit apparatus connected to said detection apparatus to compare $F_1$ and $F_2$ at two different times to determine $\Delta Z$ and $\Delta A$ and to modify $\Delta Z$ by an amount determined by $\Delta A$ to provide a signal indicative of acceleration compensated for errors due to the diameter changes.

6. Apparatus according to claim 5 wherein $L_b$=0 so that $F_2$ varies only with changes in the diameter and not for changes in the length.

* * * * *